United States Patent [19]

Dria et al.

[11] 4,426,342

[45] Jan. 17, 1984

[54] PROCESS FOR TABLETING FINE POWDERS

[75] Inventors: Dennis E. Dria, Cleveland Hts.; Noel J. Bremer, Kent, both of Ohio

[73] Assignee: The Standard Oil Company, Cleveland, Ohio

[21] Appl. No.: 332,121

[22] Filed: Dec. 18, 1981

[51] Int. Cl.³ ............................................... B29J 5/00
[52] U.S. Cl. .................................... 264/109; 252/58; 252/430; 264/DIG. 25; 502/150
[58] Field of Search ...................... 264/109, DIG. 25; 252/430, 58

[56] References Cited

U.S. PATENT DOCUMENTS

| | | | |
|---|---|---|---|
| 2,286,672 | 6/1942 | DeLamatter | 264/DIG. 25 |
| 3,231,649 | 1/1966 | Pfeiffer | 264/111 |
| 3,256,374 | 6/1966 | Suzuki | 264/109 |
| 4,159,252 | 6/1979 | Wainwright et al. | 252/58 X |
| 4,228,034 | 10/1980 | Butler et al. | 252/430 |
| 4,235,748 | 11/1980 | Berchielli et al. | 252/430 |
| 4,259,209 | 3/1981 | Nakane et al. | 252/430 |
| 4,312,787 | 1/1982 | Dolhyj et al. | 252/435 |

FOREIGN PATENT DOCUMENTS 808014  1/1959  United Kingdom .

OTHER PUBLICATIONS

Lachman; L. et al., *The Theory and Practice of Industrial Pharmacy*, Philadelphia, Lea & Febiger, 1976, pp. 327-329.

*Primary Examiner*—Donald E. Czaja
*Assistant Examiner*—James C. Housel
*Attorney, Agent, or Firm*—Salvatore P. Pace; Herbert D. Knudsen; Larry W. Evans

[57] ABSTRACT

Halogenated hydrocarbons, such as perchloroethylene, are applied to fine powders, such as metal oxides, in the absence of binders to improve the flow and tableting properties of the powders.

11 Claims, No Drawings

PROCESS FOR TABLETING FINE POWDERS

BACKGROUND OF THE INVENTION

1. Field of the Invention

The present invention relates to an improved process for tableting fine powders. In one aspect, the invention relates to improving the cohesiveness of the fine powders, while in another aspect the invention relates to improving the flow properties of fine powders.

2. Description of the Art

Fine powders can and do cause several problems when being handled, particularly when being tableted. For example, such powders flow very poorly through chutes and channels of processing equipment, stick together and bridge across the die during the loading step of tableting, creep between the punch and die during the compression and ejection steps of tableting, form air pockets in the loaded die resulting in capping and present a dust hazard. These problems offer a potential for damage to the processing machinery and the physical integrity of the tablet.

Most conventional techniques for alleviating these problems employ mixing the fine powders with binding and lubricating agents. Binders improve the strength of the compacts while lubricants increase the transmission of forces when tableting and reduce sticking to machine surfaces. Both processing agents are generally incorporated into powders in the form of aqueous or organic solutions and range from graphite and stearic acid to gum and molasses solutions. Binders which are insoluble in aqueous solutions are usually dissolved in organic solvents and then added to the fine powder. For example, *Tablet Making* by Arthur Little and K. A. Mitchell, The Northern Publishing Co., Ltd., 1968 at pages 48 and 49 discloses dissolving insoluble binders in trichloroethylene or ethanol and then adding the solution to the fine powder prior to tableting.

U.S. Pat. No. 3,838,064 discloses a method for controlling dust in a normally high-dusting material by working the material with fribrillatable polytetrafluoroethylene.

SUMMARY OF THE INVENTION

According to this invention, in a process for handling, shaping and compressing a fine powder wherein the fine powder is passed through processing equipment and shaped and compressed into tablets, the improvement comprising mixing the fine powder with a halogenated hydrocarbon in the absence of binders prior to handling, shaping and compressing the fine powder.

It has been found that when halogenated hydrocarbons are added to fine powders in the absence of binders, the flow properties of the powders are significantly improved and the powders no longer exhibit a high degree of dusting. Moreover, the addition of halogenated hydrocarbons to the fine powders prior to tableting also improves the physical integrity and shape of the tablets.

DETAILED DESCRIPTION OF THE INVENTION

The fine powders used here include any powders having small particle size which characteristically exhibit poor binding and freeflowing properties. Generally, these fine powders have particle sizes ranging from sub-micron to 30 microns. Fine powders which are insoluble or only partially soluble in the halogenated hydrocarbon are particularly suitable for use. Most particularly, powders which have a low bulk density, a high pore volume and are non-reactive to the halogenated hydrocarbons are suitable for use in the present invention.

Of particular interest are catalyst powders including metal powders which must be tableted for use in catalytic processes. Catalyst powders, such as metal oxides, and other metal compound powders, such as sulfides and carbides, characteristically exhibit small particle size and are difficult to tablet. Although the present invention is not limited to use with catalyst or metal powders, it has been found that the mixed metal oxides are not solubilized by the halogenated hydrocarbons under processing conditions and are therefore particularly suitable for use. Illustrative metal oxides include vanadium-phosphorus oxides, vanadium-phosphorus-molybdenum oxides, metal promoted vanadium-phosphorus oxides and the like. Suitable promoters may include but are not limited to the oxides of Cd, Co, Fe, Hf, Ti, U, Zn, Zr and mixtures thereof.

The hydrocarbons utilized in the present invention are liquids and are linear or branched, saturated or unsaturated, halogen substituted hydrocarbons having, preferably, 1 to 6 carbon atoms. Substituted alkanes and alkenes are preferred to substituted alkynes and substituted alkenes are preferred to substituted alkanes. Most preferred are substituted alkenes having 2 to 4 carbon atoms.

The halogen substituents on the hydrocarbons can be selected from any member of this class, but preferably are bromine, chlorine and combinations thereof. Each hydrocarbon can contain one or more halogen substituents as well as more than one individual member of the class. For example, a halogenated hydrocarbon can contain one or more substituents from only one individual member of the group such as chlorine or can contain one or more substituents from more than one member of the class such as chlorine and fluorine. Preferred are the halogenated hydrocarbons with substituents selected from only one member of the class. Most preferred are the tetrachlorinated and tetrabrominated $C_2$ to $C_4$ alkenes or mixtures thereof.

Examples of halogenated hydrocarbons include iodomethane, tribromomethane, trichloromethane, bromochloroethane, 1,2,3-trichloropropane, 2-bromobutane, tetrachloroethene, tetrabromoethene, 3-bromopropene, dibromiodoethene, 3-bromopropyne, 3-chloropropyne and the like. Preferred are tetrachloroethene and tetrabromoethene or combinations thereof.

The halogenated hydrocarbons can be added to the fine powders by any conventional means. For example, the halogenated hydrocarbons can be applied by simply dropping or spraying the liquid hydrocarbon on the fine powder and mixing. The mixing can occur by tumbling, vibrating, shaking or paddle mixing. For most fine powders having multiple components, the halogenated hydrocarbons can be added either when mixing the various ingredients during the initial mixing stage or after the powder has been mixed or formed by a separate mixing stage. In the case of metal oxides, the halogenated hydrocarbons are generally added in a separate step after the metal oxide has been prepared in liquid, separated and dried.

The precise amount of halogenated hydrocarbon employed is dependent upon the type and size of the particular fine powder used. Generally, the minimum weight percent of halogenated hydrocarbon based upon the weight of fine powder for metal oxides is at least 5% for most powders. Preferably, the weight percent of the halogenated hydrocarbons will range from 5% to 160%, most preferably from about 30% to about 100%. Generally, to aid in adding the optimum percent of halogenated hydrocarbons to the fine powder, the mercury porosimetry technique (mercury intrusion technique) can be employed to determine the pore volume of the particles. The total pore volume will indicate the maximum amount of halogenated hydrocarbon which can effectively be used. Optionally, in obtaining optimum freeflowing and tableting properties, the proper percent of halogenated hydrocarbon can be obtained by simply titrating the halogenated hydrocarbon on the fine powder until the fine powder becomes freeflowing to the eye.

The freeflowing fine powder can be tableted by many techniques widely known in the art. For example, the prepared fine powder can be tableted by hand machines, single punch power driven machines, rotary tablet machines, double rotary tablet machines and the like.

Fine powders can be calcined either prior to or subsequent to tableting depending upon the method of preparation of the powder. Generally, calcination is employed for the purpose of eliminating moisture or other volatile materials or to oxidize or reduce the fine powders. The optimum calcination sequence can be easily determined by one skilled in the art by simple comparison. Metal oxide powders exhibit similar improved characteristics with either calcination sequence.

The treated fine powders exhibit a formed tablet having an increased physical integrity and a shape which better conforms to the shape of the die. Since tablets are formed when force is applied to a confined space, successful tableting depends partly upon the effective and efficient transmission of the external force on the powder and partly upon the physical properties of the particular powder. As pressure is applied to a powder, different zones in the forming tablet are subjected to different intensities of pressure. Thus, improper distribution of pressure may result in or contribute to cracking or capping.

Although not intending to be bound to theory, it is believed that the halogenated hydrocarbons act somewhat similar to lubricants and aid in the transmission of forces on the powder. By equalizing the distribution of pressure throughout the forming tablet, tablets are produced which conform more closely to the shape of the die. Moreover, it is believed that the halogenated hydrocarbons also act dissimilar to many internal (mixed with the powder) lubricants, which weaken bonding properties, and act similar to binders by increasing bonding properties. The combination of these properties appear to decrease the occurrence of air pockets in the tablet, reduce the occurrence of capping and improve the strength of the compacts through the use of a single agent. Further, these properties occur in the absence of either a binder or a lubricant.

Although the process of the present invention is particularly useful for tableting fine powders, the present invention is also useful for increasing the freeflowing properties of fine powders such as when movement through chutes and channels of processing equipment is necessary.

Optionally, when desired, the halogenated hydrocarbons can be used in conjunction with a lubricating agent such as stearic acid graphite, talc and the like. The lubricants can be applied to the fine powder in either a mixture of halogenated hydrocarbon and lubricant or in separate applications.

SPECIFIC EMBODIMENT

A metal promoted vanadium-phosphorus oxide catalyst was prepared according to the procedure disclosed in U.S. Pat. No. 4,244,879. The powder was then screened through a 30 mesh screen and 26.9 grams was mixed with 18.0 grams of perchloroethylene (tetrachloroethene). The perchloroethylene was dispersed by continuous mixing until the powder appeared freeflowing and partially adhered to the side of the mixing container. The powder was tableted in a Stokes tableting press, Model F, into 3/16 inch (4.76 mm) tablets. The mixture was calcined for one hour at atmospheric pressure and 400° C.

In a second test, the catalyst powder was calcined prior to adding the perchloroethylene and then tableted all in accordance with the conditions specified above.

In both of the above embodiments, the tablets were cohesive, conformed to the shape of the die and exhibited little or no capping.

In contrast, when the same promoted vanadium-phosphorus oxide catalyst batch was tableted without utilizing the process of the present invention, cohesive tablets were not formed.

Thus it should be apparent to those skilled in the art that the subject invention accomplishes the objects set forth above. It is to be understood that the subject invention is not to be limited by the examples set forth herein. These have been provided merely to demonstrate operability and the selection of processing additives, fine powders and reaction conditions can be determined from the total specification disclosure provided without departing from the spirit of the invention herein disclosed and described. The scope of the invention includes equivalent embodiments, modifications and variations that fall within the scope of the attached claims.

We claim:

1. In a process for compressing a fine powder into a tablet wherein the powder is mixed with an agent to increase the binding and free flowing properties of the powder prior to compressing the tablet, the improvement wherein the agent is a liquid halogenated hydrocarbon or mixtures thereof.

2. The process of claim 1 wherein the halogenated hydrocarbon is selected from the group consisting of halogen substituted alkanes, alkenes and alkynes having 1 to 6 carbon atoms.

3. The process of claim 1 wherein the halogenated hydrocarbon is selected from the group consisting of halogen substituted alkenes having 2 to 6 carbon atoms.

4. The process of claim 1 wherein the halogenated hydrocarbon is selected from the group consisting of halogen substituted alkenes having from 2 to about 4 carbon atoms.

5. The process of claim 1 wherein the halogenated hydrocarbon contains a halogen substituent selected from the group consisting of bromine, chlorine and a combination thereof.

6. The process of claim 5 wherein the halogenated hydrocarbon is selected from the group consisting of tetrachloroethene, tetrabromoethene and a combination thereof.

7. The process of claim 1 wherein the fine powder is selected from the group consisting of metal oxides and mixed metal oxides.

8. The process of claim 1 wherein the fine powder is selected from the group consisting of vanadium-phosphorus oxides, vanadium-phosphorus-molybdenun oxides and metal promoted vanadium-phosphorus oxides.

9. The process of claim 1 wherein the weight percent of halogenated hydrocarbons mixed with the fine powder based upon the weight of the fine powder is about 30% to about 100%.

10. The process of claim 1 wherein the halogenated hydrocarbon is used in combination with a lubricating agent.

11. The process of claim 10 wherein the lubricating agent is selected from the group consisting of stearic acid, graphite and talc.

* * * * *